(12) United States Patent  
Green et al.

(10) Patent No.: US 9,402,486 B2  
(45) Date of Patent: Aug. 2, 2016

(54) CENTERING ADAPTER PLATE FOR CAMERA SENSOR

(71) Applicant: InVue Security Products Inc., Charlotte, NC (US)

(72) Inventors: Barry John Green, Lincolnton, NC (US); Larry T. McKinney, Huntersville, NC (US); Robert Bisesti, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 14/406,949

(22) PCT Filed: Jun. 27, 2013

(86) PCT No.: PCT/US2013/048174  
§ 371 (c)(1),  
(2) Date: Dec. 10, 2014

(87) PCT Pub. No.: WO2014/004826  
PCT Pub. Date: Jan. 3, 2014

(65) Prior Publication Data  
US 2015/0173525 A1 Jun. 25, 2015

Related U.S. Application Data

(60) Provisional application No. 61/665,660, filed on Jun. 28, 2012.

(51) Int. Cl.  
*F16M 13/00* (2006.01)  
*A47F 3/00* (2006.01)  
(Continued)

(52) U.S. Cl.  
CPC ............. *A47F 3/002* (2013.01); *A47F 3/004* (2013.01); *A47F 7/024* (2013.01); *F16M 13/00* (2013.01);

(Continued)

(58) Field of Classification Search  
CPC .................................................. E05B 73/0082  
USPC ........ 248/551, 552, 553, 177.1, 176.1, 187.1; 396/FOR. 913  
See application file for complete search history.

(56) References Cited

U.S. PATENT DOCUMENTS 4,687,165 A * 8/1987 Blackburn ................. 248/274.1  
5,341,124 A * 8/1994 Leyden et al. ............. 340/568.4

(Continued)

FOREIGN PATENT DOCUMENTS

JP  2012053363 A  3/2012

OTHER PUBLICATIONS

Jae Yul Ahn, "The International Search Report and the Written Opinion of the International Searching Authority or the Declaration" for International Application No. PCT/US2013/048174 filed on Jun. 27, 2013, Sep. 25, 2013, 14 pages, Commissioner for Korean Intellectual Property Office, Daejeon Metropolitan City, Republic of Korea.

*Primary Examiner* — Terrell McKinnon  
*Assistant Examiner* — Michael McDuffie  
(74) *Attorney, Agent, or Firm* — InVue Security Products Inc.

(57) ABSTRACT

An adapter plate for securing an item of merchandise to a merchandise security device is provided. For example, the adapter plate includes a body configured to be secured to an item of merchandise, wherein at least one slot is defined in the body. The at least one slot is configured to receive a first fastener for securing the body to the item of merchandise, and the body is laterally adjustable relative to the item of merchandise via engagement of the first fastener with the at least one slot. The body is configured to engage a second fastener for securing the body to the merchandise security device.

22 Claims, 7 Drawing Sheets

(51) Int. Cl.
*A47F 7/024* (2006.01)
*G03B 17/56* (2006.01)
*G06Q 90/00* (2006.01)
*E05B 73/00* (2006.01)

(52) U.S. Cl.
CPC ............ *G03B 17/561* (2013.01); *G03B 17/566* (2013.01); *G06Q 90/00* (2013.01); *E05B 73/0082* (2013.01); *F16M 2200/08* (2013.01)

(56) References Cited

U.S. PATENT DOCUMENTS

| | | | |
|---|---|---|---|
| 5,861,807 A | 1/1999 | Leyden et al. | |
| 6,027,277 A | 2/2000 | Leyden et al. | |
| 6,039,498 A * | 3/2000 | Leyden et al. | 403/61 |
| 6,915,996 B2 | 7/2005 | Lin | |
| 7,446,659 B2 * | 11/2008 | Marsilio et al. | 340/568.1 |
| 7,614,601 B2 * | 11/2009 | Marsilio et al. | 248/551 |
| 7,971,845 B2 * | 7/2011 | Galant | 248/551 |
| 8,674,833 B2 | 3/2014 | Johnston et al. | |
| 8,807,496 B2 * | 8/2014 | Kessler et al. | 248/187.1 |
| 2007/0194918 A1 * | 8/2007 | Rabinowitz et al. | 340/568.2 |
| 2008/0156959 A1 | 7/2008 | Fawcett et al. | |
| 2008/0197246 A1 * | 8/2008 | Belden | 248/176.1 |
| 2008/0230668 A1 * | 9/2008 | Johnson | H02G 3/20 248/343 |
| 2012/0120571 A1 * | 5/2012 | Bisesti et al. | 361/679.01 |
| 2012/0192600 A1 * | 8/2012 | Johnston et al. | 70/58 |
| 2014/0059828 A1 * | 3/2014 | Reynolds et al. | 29/428 |
| 2014/0063238 A1 | 3/2014 | Abdollahzadeh et al. | |

* cited by examiner

CENTERING ADAPTER PLATE FOR CAMERA SENSOR

CROSS REFERENCE TO RELATED APPLICATIONS

This application is a national stage application under 35 U.S.C. 371 and claims the benefit of International Application No. PCT/US2013/048174, filed on Jun. 27, 2013, and U.S. Provisional Application No. 61/665,660, filed on Jun. 28, 2012, the entire disclosures of which are incorporated herein by reference.

FIELD OF THE INVENTION

Embodiments of the present invention relate to merchandise security, and, more particularly, to adapter plates, systems, and methods for securing retail display merchandise from theft.

BACKGROUND OF THE INVENTION

Existing camera sensors are typically attached to the tripod mounting hole provided on a conventional camera or digital video recorder (DVR). The location of the tripod mounting hole varies greatly, as well as the dimensions and shape (planform) of cameras and DVR. As a result, the camera or DVR oftentimes is not centered on the camera sensor. Accordingly, the merchandise display is not symmetrical, and thus, is not aesthetically pleasing to a potential customer and may be unstable. It is known to provide an adjustable adapter plate between the merchandise and the camera sensor. However, known adapter plates obstruct an alarm switch of the camera sensor and/or interfere with the operation of an anti-rotation bracket of the camera sensor that prevents the merchandise from being rotated and thereby causing false alarms or theft. Thus, an adapter plate for centering an item of merchandise for display on a merchandise security device is needed that permits a camera or DVR to be centered on a camera sensor without obstructing an alarm switch and without interfering with the operation of an anti-rotation bracket of the camera sensor.

SUMMARY OF THE INVENTION

Embodiments of the present invention are directed to an adapter plate for centering an item of merchandise for display on a merchandise security device. In one embodiment, a centering adapter plate is provided that includes an alarm switch extension for a camera sensor having a movable anti-rotation element. Embodiments of the present invention also include a method for centering an item of merchandise, for example, a camera, for display on a merchandise security device, namely a camera sensor removably supported on a merchandise display stand.

In one embodiment, an adapter plate for securing an item of merchandise to a merchandise security device is provided. For example, the adapter plate includes a body configured to be secured to an item of merchandise, wherein at least one slot is defined in the body. The at least one slot is configured to receive a first fastener for securing the body to the item of merchandise, and the body is laterally adjustable relative to the item of merchandise via engagement of the first fastener with the at least one slot. The body is configured to engage a second fastener for securing the body to the merchandise security device.

In another embodiment, a system for securing an item of merchandise to a merchandise security device is provided. The system includes an adapter plate comprising a body configured to be secured to an item of merchandise, wherein at least one slot is defined in the body. The at least one slot is configured to receive a first fastener for securing the body to the item of merchandise, and the body is laterally adjustable relative to the item of merchandise via engagement of the first fastener with the at least one slot. The system further includes a sensor of the merchandise security device configured to be secured to the body with a second fastener.

In one embodiment, a system for securing an item of merchandise to a merchandise security device is provided. The system includes an adapter plate configured to be secured to an item of merchandise, wherein the adapter plate includes an alarm switch extension movably retained therein. The system also includes a sensor of the merchandise security device configured to be secured to the adapter plate. The sensor includes an alarm switch configured to align with the alarm switch extension of the adapter plate such that the alarm switch extension is configured to engage the alarm switch and the item of merchandise when the sensor is secured to the adapter plate.

In another embodiment of a system for securing an item of merchandise to a merchandise security device, the system includes an adapter plate configured to be secured to an item of merchandise. The system further includes a sensor of the merchandise security device configured to be secured to the adapter plate, the sensor comprising a plurality of anti-rotation grooves. The system also includes an anti-rotation bracket configured to prevent rotation of the item of merchandise relative the adapter plate, wherein each of the plurality of anti-rotation grooves is configured to receive the anti-rotation bracket in a different radial position relative to the sensor.

In one embodiment, a method for securing an item of merchandise to a merchandise display device is provided. The method includes positioning an adapter plate relative to an item of merchandise such that a fastener opening provided on the item of merchandise is accessible and positioning a first fastener through at least one slot defined in the adapter plate and into the fastener opening. The method further includes securing the adapter plate to the item of merchandise via the first fastener and securing a sensor of the merchandise security device to the adapter plate via a second fastener.

Another embodiment of a method for securing an item of merchandise to a merchandise display device includes securing an adapter plate to an item of merchandise, wherein the adapter plate includes an alarm switch extension movably retained therein. In addition, the method includes securing a sensor of the merchandise security device to the adapter plate such that the alarm switch extension aligns with and engages an alarm switch on the sensor and the alarm switch extension engages the item of merchandise.

DETAILED DESCRIPTION OF THE PREFERRED EMBODIMENTS

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art Like numbers refer to like elements throughout, and prime notation and multiple prime notations are used to indicate similar elements in alternative embodiments.

Figure 1:
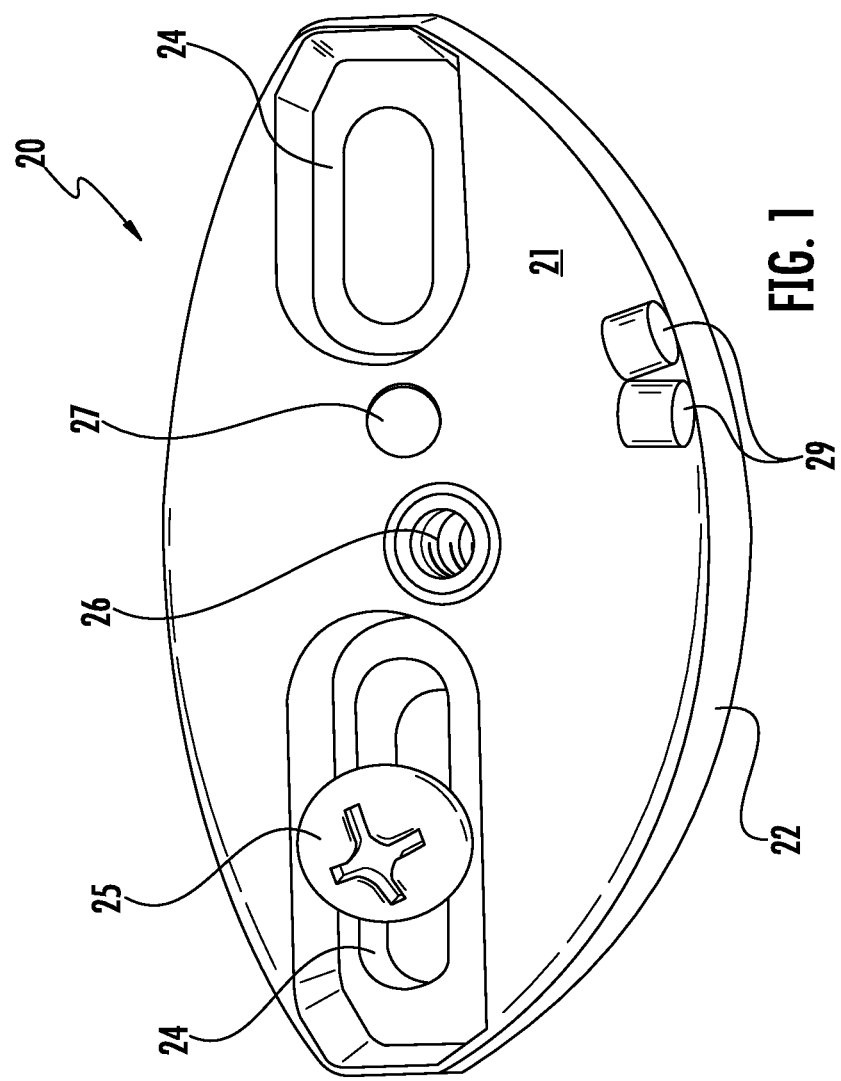
FIG. 1 is a plan view showing the underside of an adapter plate according to one embodiment of the invention including a fastener for attaching the adapter plate to the tripod mounting hole of a camera.
Figure 6:
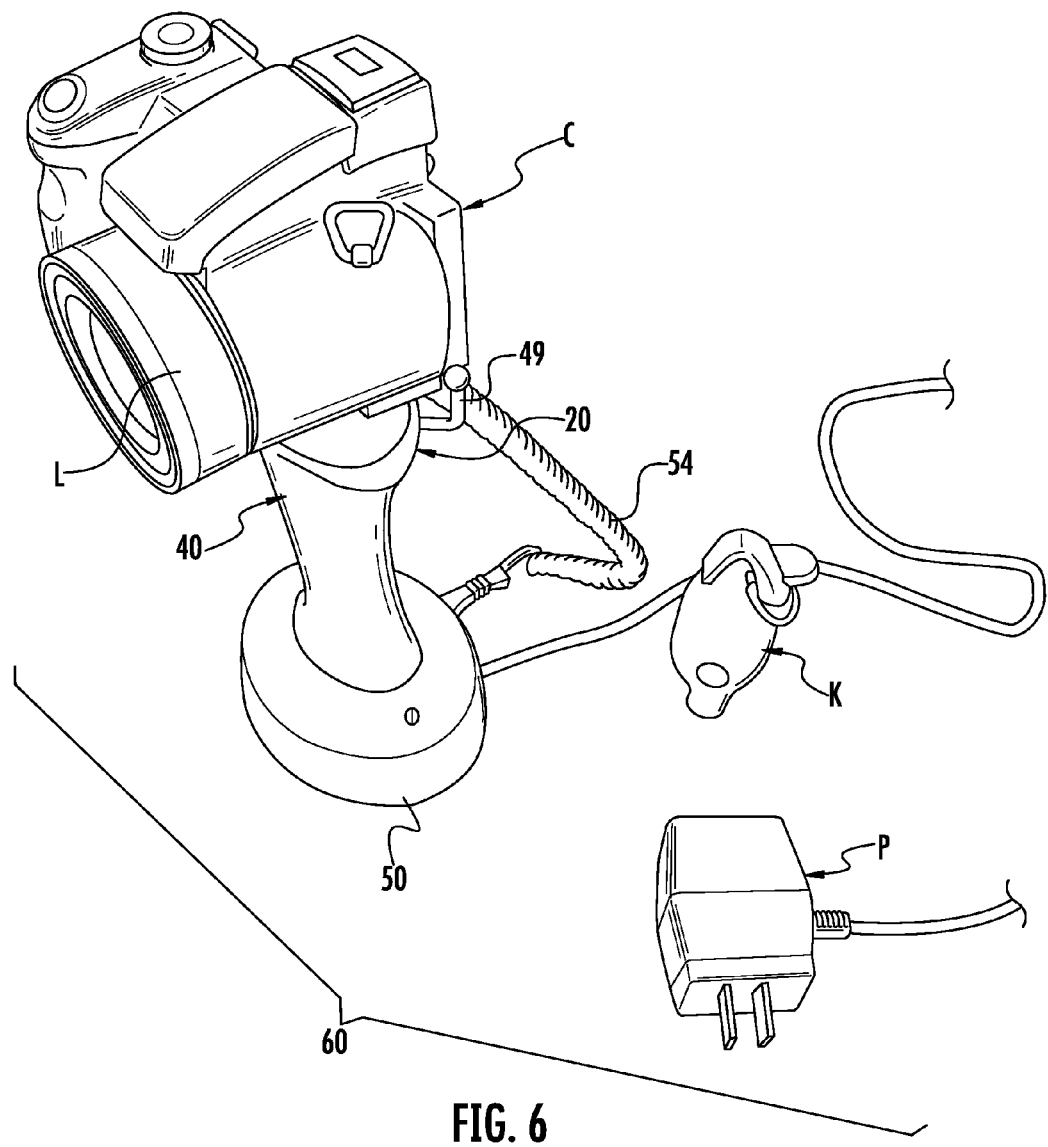
FIG. 6 is a perspective view showing a merchandise display security system including the camera sensor, adapter plate and camera of FIG. 5 removably supported on a merchandise display stand with the camera centered relative to the camera sensor and the merchandise display stand.

FIG. 1 shows an adapter plate 20 according to one embodiment of the invention configured for attachment to an item of merchandise, for example, a camera C, for display on a merchandise security device, for example, a camera sensor 40 (see FIG. 4) of a merchandise display security system 60 (see FIG. 6). The adapter plate 20 comprises a body 22 defining an underside 21 shown in FIG. 1 and a topside 23 shown in FIG. 2. The body 22 has at least one, and preferably, a pair of elongate slots 24 formed therethrough for receiving a threaded fastener 25 for attaching the adapter plate 20 to the camera C. Slots 24 permit lateral adjustment of the position of the adapter plate 20 on the camera C when the fastener 25 engages a threaded tripod mounting hole (not shown) provided on the camera. The fastener 25 is tightened within the tripod mounting hole against the underside 21 of the body 22 to secure the adapter plate 20 in a desired location relative to the camera C. In one embodiment, the camera C is centered on the adapter plate 20 relative to a threaded sensor mounting hole 26 provided on the underside 21 of the body 22 of the adapter plate 20.

Figure 2:
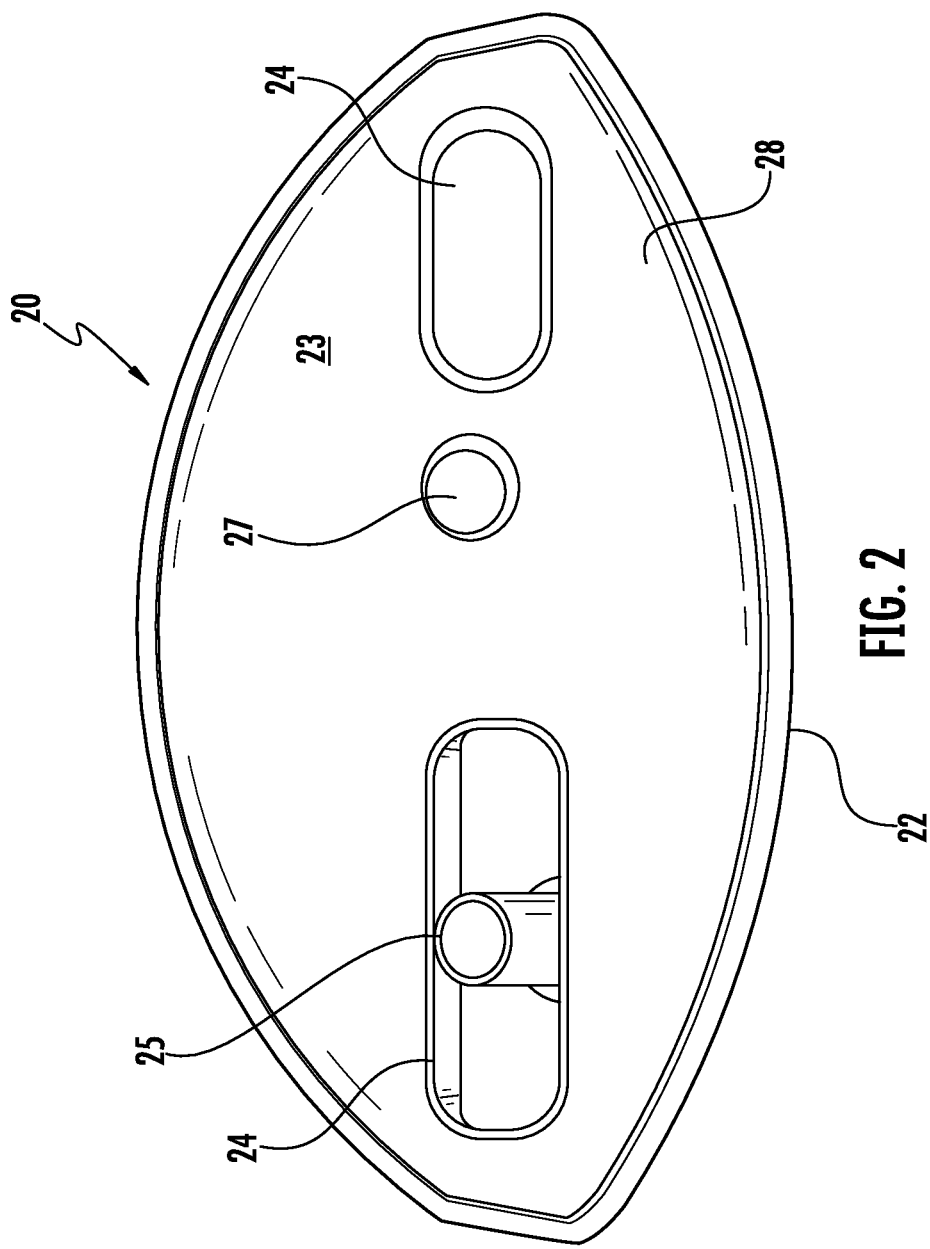
FIG. 2 is a plan view of the topside of the adapter plate of FIG. 1 showing the fastener for the tripod mounting hole of the camera and an alarm switch extension.

As shown in FIG. 1 and FIG. 2, the adapter plate 20 further comprises an alarm switch extension 27 for engaging an alarm switch 44 (FIG. 4) provided on the camera sensor 40. The alarm switch extension 27 is movably retained within the body 22 of the adapter plate 20 so as to be flush with the topside 23 of the body in a first position and so as to extend upwardly or outwardly from the topside of the body in a second position when engaging the alarm switch 44 of the camera sensor 40, as will be described. The position of the alarm switch extension 27 is determined by whether the adapter plate 20 is properly positioned on and attached to the camera sensor 40, as will be described. If desired, the adapter plate 20 may be further provided with a relatively thin layer of a resilient material, for example rubber, 28 that is attached, adhered or affixed to the topside 23 of the body 22 to inhibit rotation of the camera C relative to the adapter plate with the fastener 25 securing the camera and the adapter plate together. As best shown in FIG. 1, adapter plate 20 may further comprise at least one, and preferably, a pair of locating ribs 29 configured for aligning the adapter plate in a desired position relative to the camera sensor 40 so that the alarm switch 44 engages the alarm switch extension 27 of the adapter plate in an operative manner.

Figure 3:
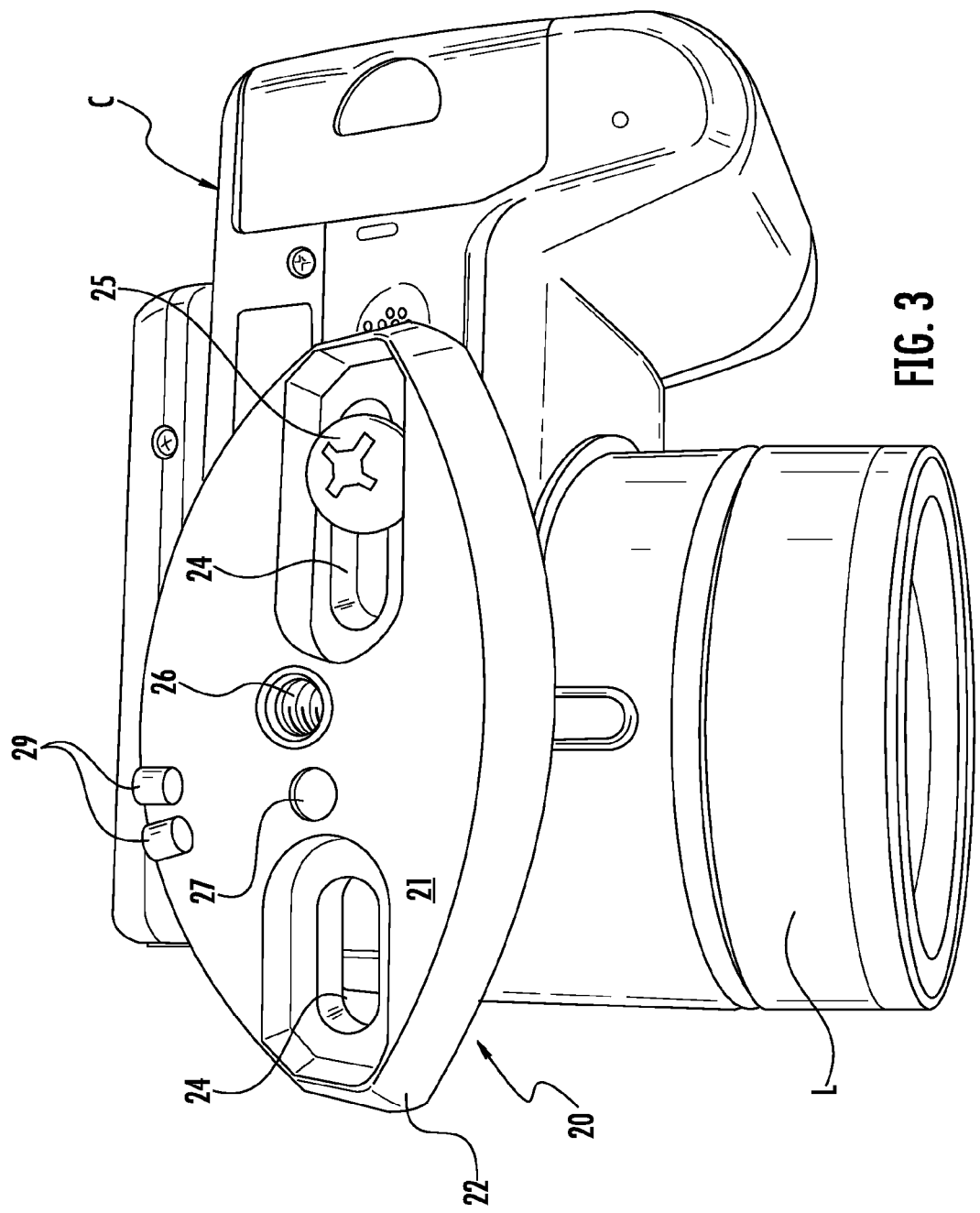
FIG. 3 is a perspective view showing the adapter plate of FIG. 1 attached to a camera by the fastener such that the camera is centered in a desired location relative to a sensor mounting hole of the adapter plate.

FIG. 3 shows the adapter plate 20 attached to the camera C by fastener 25 engaged with the tripod mounting hole (not shown) of the camera through one of the slots 24. The body 22 of the adapter plate 20 is positioned and the fastener 25 secures the adapter plate to the camera C through the slot 24 such that the camera may be centered on the adapter plate relative to the sensor mounting hole 26. In the illustrated example, the cylindrical lens L of the camera C is aligned with the sensor mounting hole 26 so that the merchandise display stand 50 on the merchandise display security system 60 is also aligned with the lens L, as shown in FIG. 6. It should be noted that the alarm switch extension 27 is flush with the underside 21 of the body 22 of the adapter plate 20 and cannot be depressed towards the topside 23 of the body of the adapter plate since the topside of the adapter plate is in relatively flush contact with the underside of the camera C.

Figure 4:
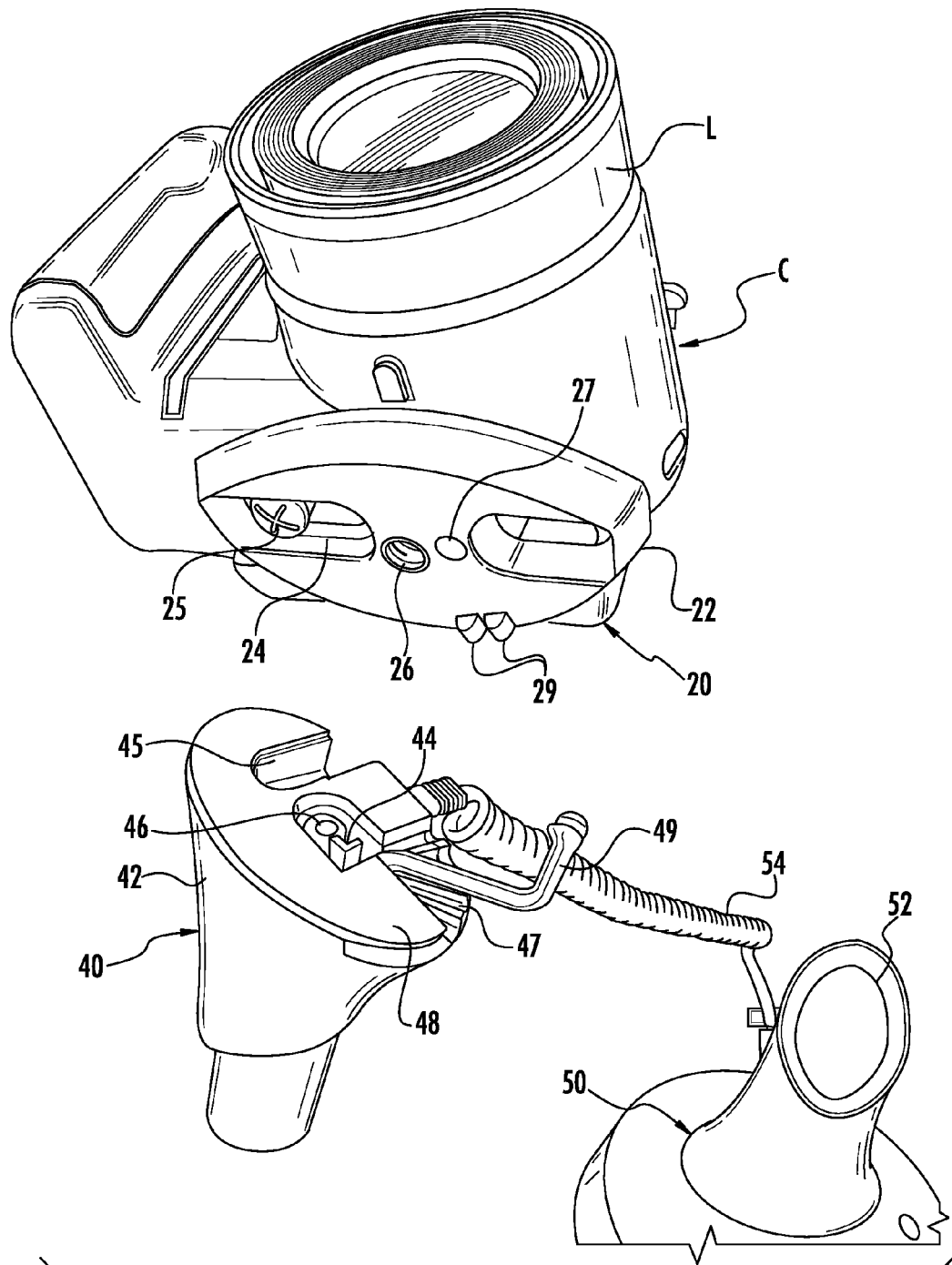
FIG. 4 is a perspective view showing a camera sensor having an alarm switch, an anti-rotation bracket and a sensor fastener for attaching the camera sensor to the adapter plate and camera of FIG. 3.

FIG. 4 shows the adapter plate 20 and the camera C configured for attachment to the camera sensor 40 such that the camera may be centered relative to the camera sensor. The camera sensor C comprises a housing 42 adapted to contain electronics for providing power and controlling the alarm switch 44 of the camera sensor 40 in a known manner. The electronics disposed within housing 42 may further provide power at an appropriate operating voltage and/or current to a power adapter cord PC (FIG. 7) for delivering electrical power to the camera C in a known manner such that the camera is operational while on display. When utilized, the power adapter cord PC is received within a power output port disposed within a recess 45 formed in the housing 42 of the camera sensor 40. The alarm switch 44 is biased upwardly from the housing 42 so that an open circuit condition exists unless the camera sensor 40 is securely affixed or attached to an item of merchandise, for example, directly to the camera C or indirectly to the camera C by means of the adapter plate 20. Camera sensor 40 further comprises a threaded sensor fastener 46 for attaching the camera sensor to the camera C, and more specifically, for attaching the camera sensor to the adapter plate 20 by means of sensor mounting hole 26 provided on the adapter plate 20. Camera sensor 40 may further comprise at least one, and preferably, a plurality of radially spaced grooves 47 for receiving an optional adjustable anti-rotation bracket 49 in a suitable position for preventing rotation of the camera C when the camera sensor and the camera are secured together. If desired, the camera sensor 40 may be further provided with a relatively thin layer of a resilient material, for example, rubber, 48 that is attached, adhered or affixed to the housing 42 to inhibit rotation of the adapter plate 20 and the camera C relative to the camera sensor with the sensor fastener 46 securing the camera sensor and the adapter plate together.

Figure 5:
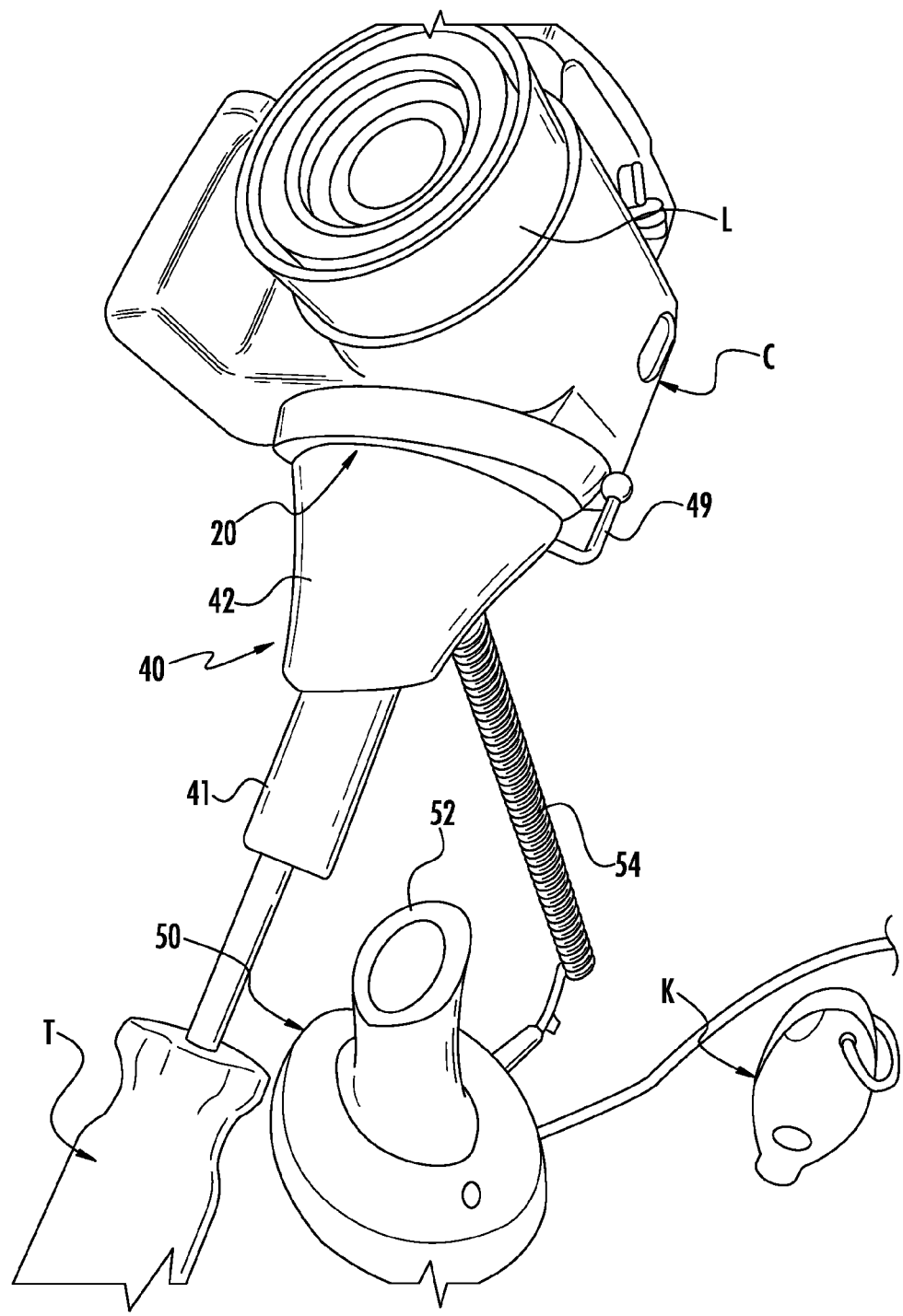
FIG. 5 is a perspective view illustrating the camera sensor of FIG. 4 attached by the sensor fastener to the sensor mounting hole of the adapter plate such that the camera is centered on the camera sensor.

FIG. 5 illustrates the camera sensor 40 attached to the adapter plate 20 and the camera C. The camera sensor 40 is attached directly to the adapter plate 20, and thus, indirectly to the camera C attached to the adapter plate, as previously described, by engaging the sensor fastener 46 with the sensor mounting hole 26 of the adapter plate. More specifically, the sensor fastener 46 may be tightened using a special tool T inserted into the hollow housing 42 of the camera sensor 40 until the camera sensor and the adapter plate 20 (and camera C) are secured together. It should be noted that the locating ribs 29 provided on the underside 23 of the body 22 of the adapter plate are received within corresponding ones of the grooves 47 formed in the housing 42 of the camera sensor 40 to align the adapter plate with the camera sensor such that the alarm switch extension 27 of the adapter plate engages with and depresses the alarm switch 44 on the housing of the camera sensor as the sensor fastener 46 secures the camera sensor and the adapter plate together. As such, a closed circuit condition is established with the electronics disposed within the housing 42 of the camera sensor 40 in a known manner. In addition, the alarm switch extension 27 allows for direct engagement with the item of merchandise rather than engagement only with the adapter plate 20. As such, the item of merchandise is further secured since the item of merchandise cannot be removed from the adapter plate 20 without triggering an alarm. It should also be noted that anti-rotation bracket 49 is positioned adjacent the camera C with the camera sensor 40 secured to the adapter plate 20 to prevent rotation of the camera relative to the camera sensor.

FIG. 6 shows a merchandise display security system 60 comprising the camera sensor 40 attached to the adapter plate 20 and the camera C and removably supported on a merchandise display stand 50. As best shown in FIG. 5, the merchandise display stand 50 defines an opening 52 for receiving a stem, or post, 41 depending downwardly from the housing 42 of the camera sensor 40. The post 41 of the camera sensor 40 is removably received within the opening 52 defined by the merchandise display stand 50 in a self-aligning manner facilitated by gravity and the opposing geometry of the housing 42 such that the camera sensor is positioned on the merchandise display in the preferred orientation shown in FIG. 6. As shown in FIG. 5 and FIG. 6, a sensor cord 54 electrically connects the electronics disposed within the housing 42 of the camera sensor 40 with electronics disposed within the merchandise display stand 50. The electronics of the merchandise display stand 50 are configured to monitor the state (i.e. open circuit condition or closed circuit condition) of the alarm switch 44, and to provide electrical power to the electronics of the camera sensor 40, and optionally, further to the camera C, as previously described. In addition, the electronics of the merchandise display stand may optionally alternately arm and disarm the alarm switch 44 of the camera sensor 40 using a merchandise display security key K in a known manner.

Figure 7:
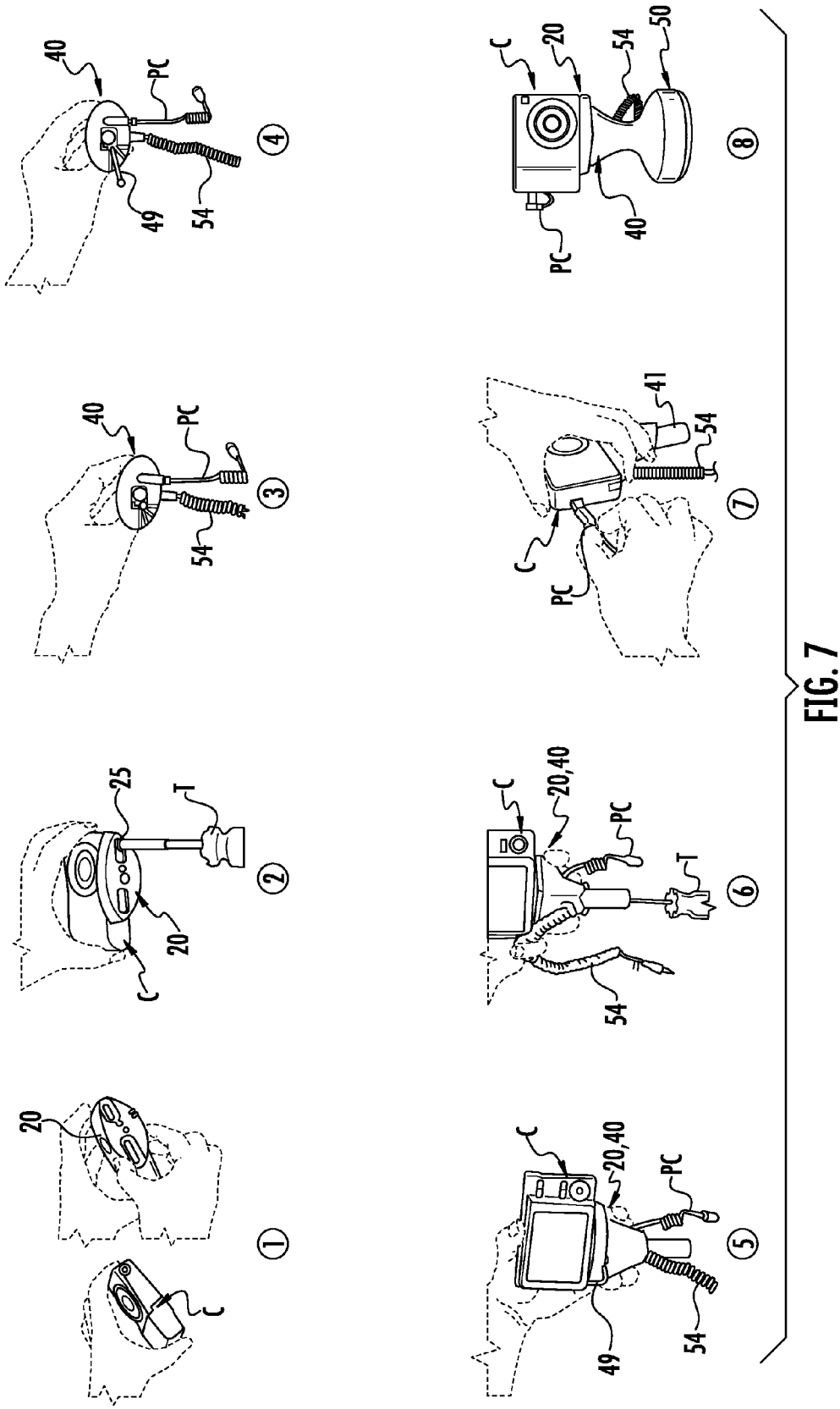
FIG. 7 is a series of sequential views illustrating a method according to one embodiment of the invention for using an adapter plate according to the invention to center a handheld camera on the camera sensor for display on the merchandise security stand of FIG. 6.

FIG. 7 illustrates one embodiment of a series of sequential steps of a method for centering an item of merchandise, for example, camera C, on a merchandise security device, for example, camera sensor 40. In a first step, the adapter plate 20 is centered on the camera C with one of the slots 24 positioned such that the tripod mounting hole (not shown) of the camera is accessible to engage fastener 25. Adapter plate 20 is then secured to camera C by tightening fastener 25 within the tripod mounting hole until the topside 23 of the body 22 of the adapter plate is essentially flush with the underside of the camera. If desired, a power adapter cord PC is then positioned within recess 45 formed in the housing 42 of the camera sensor 40 and connected to the power output port on the housing in electrical communication with the electronics disposed within the housing. Next, a suitable anti-rotation bracket 49 is selected and positioned within the appropriate groove 47 formed in the housing 42 of the camera sensor 40. The adapter plate 20 and camera C are then placed onto the camera sensor 40, and the locating rib(s) 29 of the adapter plate are positioned within the appropriate groove(s) 47 formed in the housing 42 of the camera sensor 40 to align the alarm switch extension 27 on the adapter plate with the alarm switch 44 on the camera sensor. The sensor fastener 46 is then tightened using the special tool T to secure the camera sensor 40 and the adapter plate 20/camera C together with the anti-rotation bracket 49 in an appropriate position adjacent the camera C to prevent rotation of the camera relative to the camera sensor 40. The power adapter cord PC is then connected to the power input port provided on the camera C. Finally, the camera sensor 40 is positioned on the merchandise display stand 50 in the desired orientation for displaying the camera C on the merchandise display.

Although the item of merchandise is discussed above as being directed to a camera, it is understood that other items of merchandise may be employed. For instance, any item of merchandise that includes a defined fastener opening, or a particular size and configuration, that presents alignment or security issues may be used.

Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. An adapter plate securing a camera to a sensor of a merchandise security device, the adapter plate comprising:
    a body secured to the camera,
        wherein at least one slot is defined in the body, the at least one slot configured to receive a first fastener to secure the body to the camera, the body being laterally adjustable relative to the camera via engagement of the first fastener with the at least one slot, and
        wherein the body is configured to engage a second fastener for securing the body to the sensor such that the body and the sensor are carried by the camera.

2. The adapter plate of claim 1, wherein a pair of slots are defined in the body, each of the slots configured to receive the first fastener.

3. The adapter plate of claim 2, wherein at least one opening is defined in the body and is configured to receive the second fastener for securing the body to the sensor, and wherein the at least one opening is defined between the pair of slots.

4. The adapter plate of claim 1, wherein at least one opening is defined in the body and is configured to receive the second fastener for securing the body to the sensor.

5. The adapter plate of claim 1, further comprising an alarm switch extension movably retained within the body.

6. The adapter plate of claim 5, wherein the alarm switch extension is configured to align with and engage an alarm switch of the sensor.

7. The adapter plate of claim 1, further comprising at least one locating rib protruding from the body, the at least one locating rib configured to align the body with the sensor.

8. The adapter plate of claim 1, wherein the at least one slot is configured to receive the first fastener for coupling the body to a tripod mounting hole provided on the camera.

9. A system for securing an item of merchandise to a merchandise security device, the system comprising:
    an adapter plate comprising:
        a body configured to be secured to an item of merchandise,
            wherein at least one slot is defined in the body, the at least one slot configured to receive a first fastener for securing the body to the item of merchandise, the body being laterally adjustable relative to the item of merchandise via engagement of the first fastener with the at least one slot; and a sensor of the merchandise security device configured to be secured to the body with a second fastener, wherein the body is configured to be fixed between the item of merchandise and the sensor such that the body and the sensor are configured to be carried by the item of merchandise.

10. The system of claim 9, wherein the sensor comprises at least one anti-rotation groove.

11. The system of claim 10, further comprising an anti-rotation bracket configured to prevent rotation of the item of merchandise relative the body, wherein the at least one anti-rotation groove is configured to receive the anti-rotation bracket.

12. The system of claim 10, wherein the sensor comprises a plurality of anti-rotation grooves, each groove configured to receive an anti-rotation bracket in a different radial position relative to the sensor.

13. The system of claim 9, wherein the sensor comprises an alarm switch.

14. The system of claim 13, further comprising an alarm switch extension movably retained within the body, wherein the alarm switch extension is configured to align with the alarm switch such that the alarm switch extension is configured to engage the alarm switch and the item of merchandise when the sensor is secured to the body.

15. The system of claim 9, wherein at least one opening is defined in the body and is configured to receive the second fastener for securing the body to the sensor.

16. The system of claim 9, wherein the first fastener is configured to threadably engage a tripod mounting hole provided on a camera.

17. The system of claim 9, wherein the body comprises at least one locating rib protruding therefrom, the at least one locating rib configured to align the body with the merchandise display device.

18. The system of claim 17, wherein the sensor comprises at least one groove configured to align with the at least one locating rib.

19. The system of claim 9, further comprising a display stand configured to removably support the adaptor plate and the sensor thereon.

20. A method for securing an item of merchandise to a merchandise display device, the method comprising:

positioning an adapter plate relative to an item of merchandise such that a fastener opening provided on the item of merchandise is accessible;

positioning a first fastener through at least one slot defined in the adapter plate and into the fastener opening;

securing the adapter plate to the item of merchandise via the first fastener; and securing a sensor of the merchandise security device to the adapter plate via a second fastener such that the body and the sensor are configured to be carried by the item of merchandise.

21. The method of claim 20, further comprising laterally adjusting the adapter plate relative to the item of merchandise while the first fastener is positioned through the at least one slot and in the fastener opening.

22. The method of claim 20, wherein securing the sensor comprises securing the sensor to the adapter plate such that the adapter plate is fixed between the item of merchandise and the sensor for centering the sensor relative to the item of merchandise.

* * * * *